May 8, 1923.
H. A. WIER ET AL
MEANS FOR CRACKING HYDROCARBONS
Filed April 12, 1920
1,454,142
3 Sheets-Sheet 1
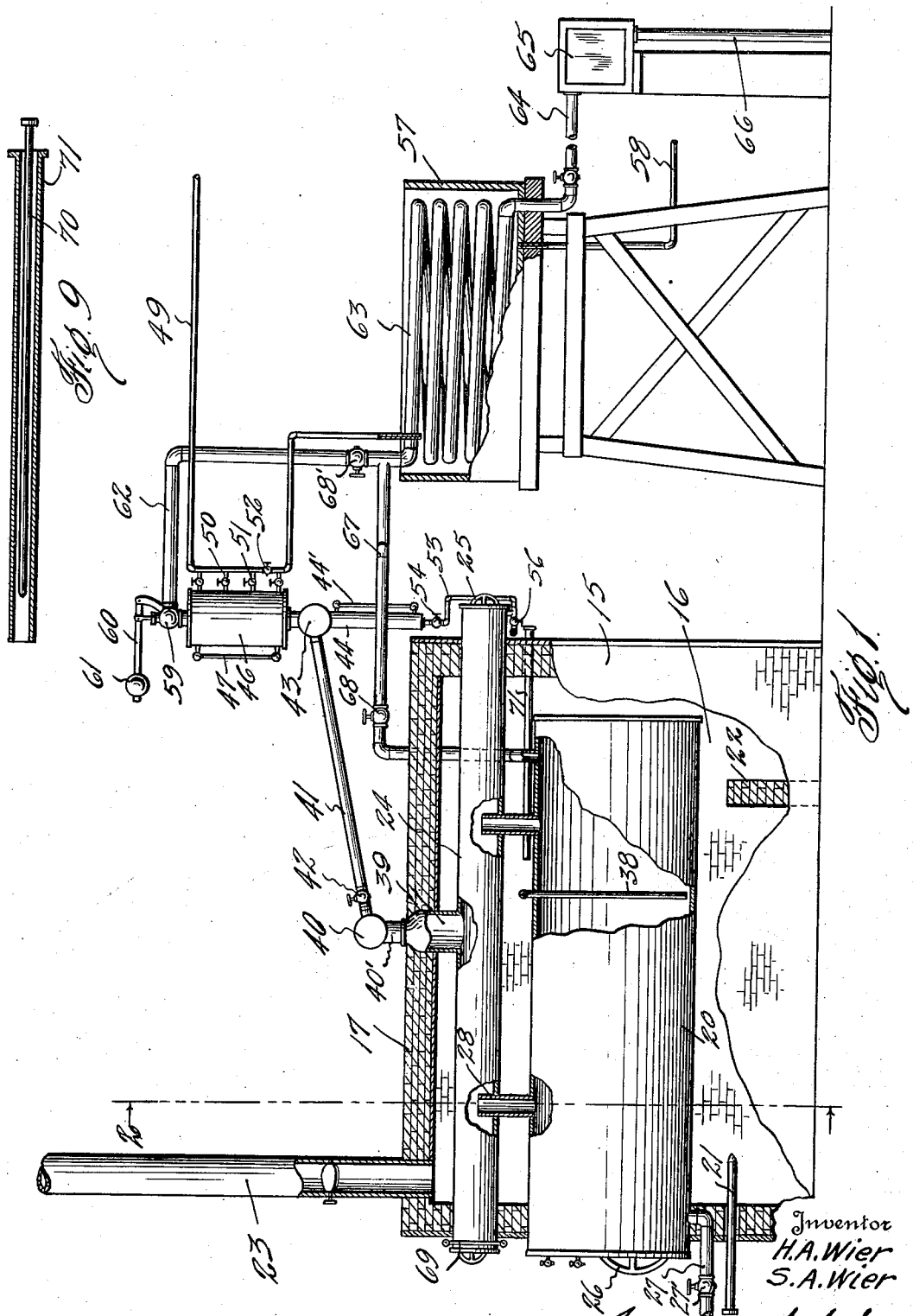
Inventor
H. A. Wier
S. A. Wier
By Jack A. Ashly
Attorney

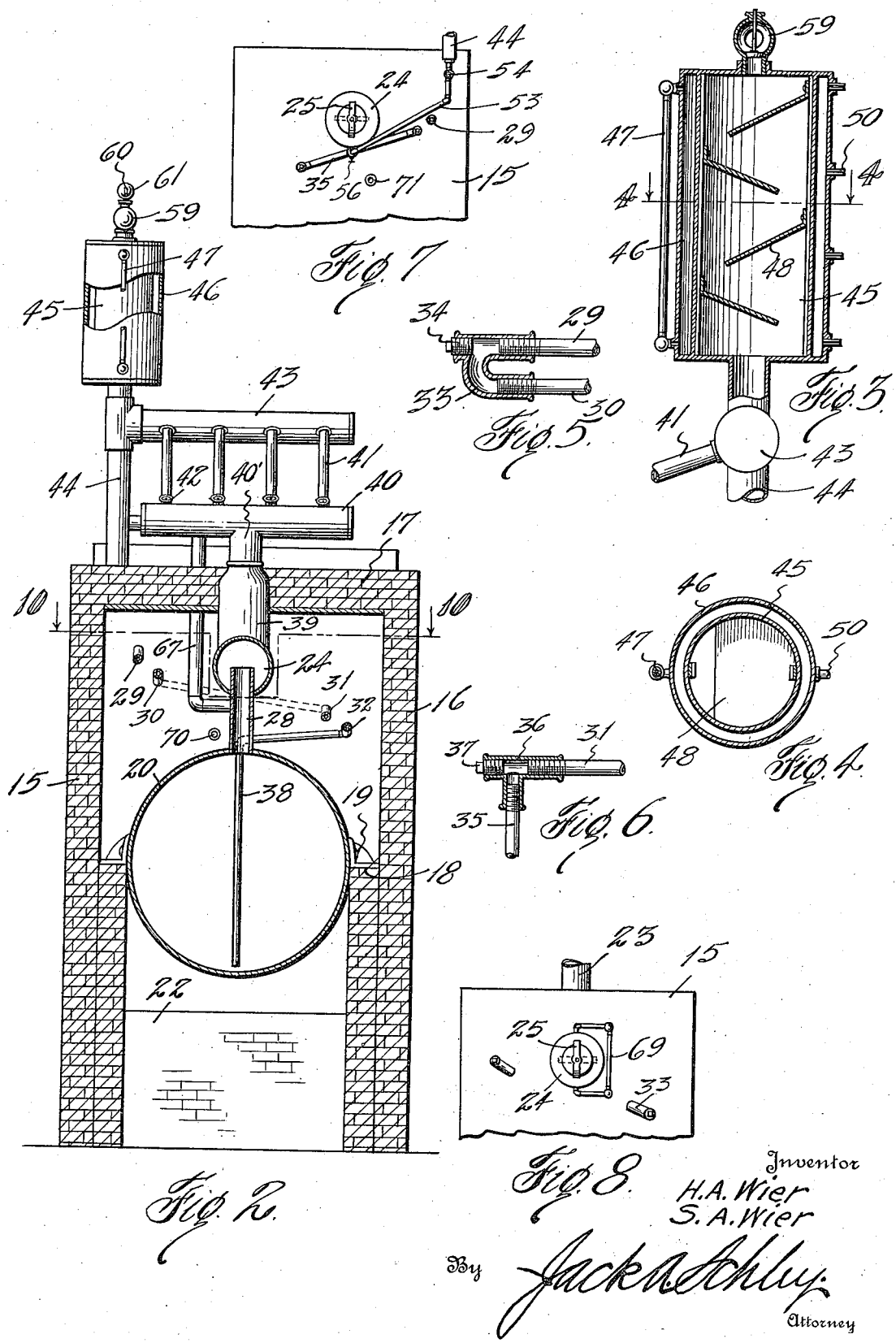

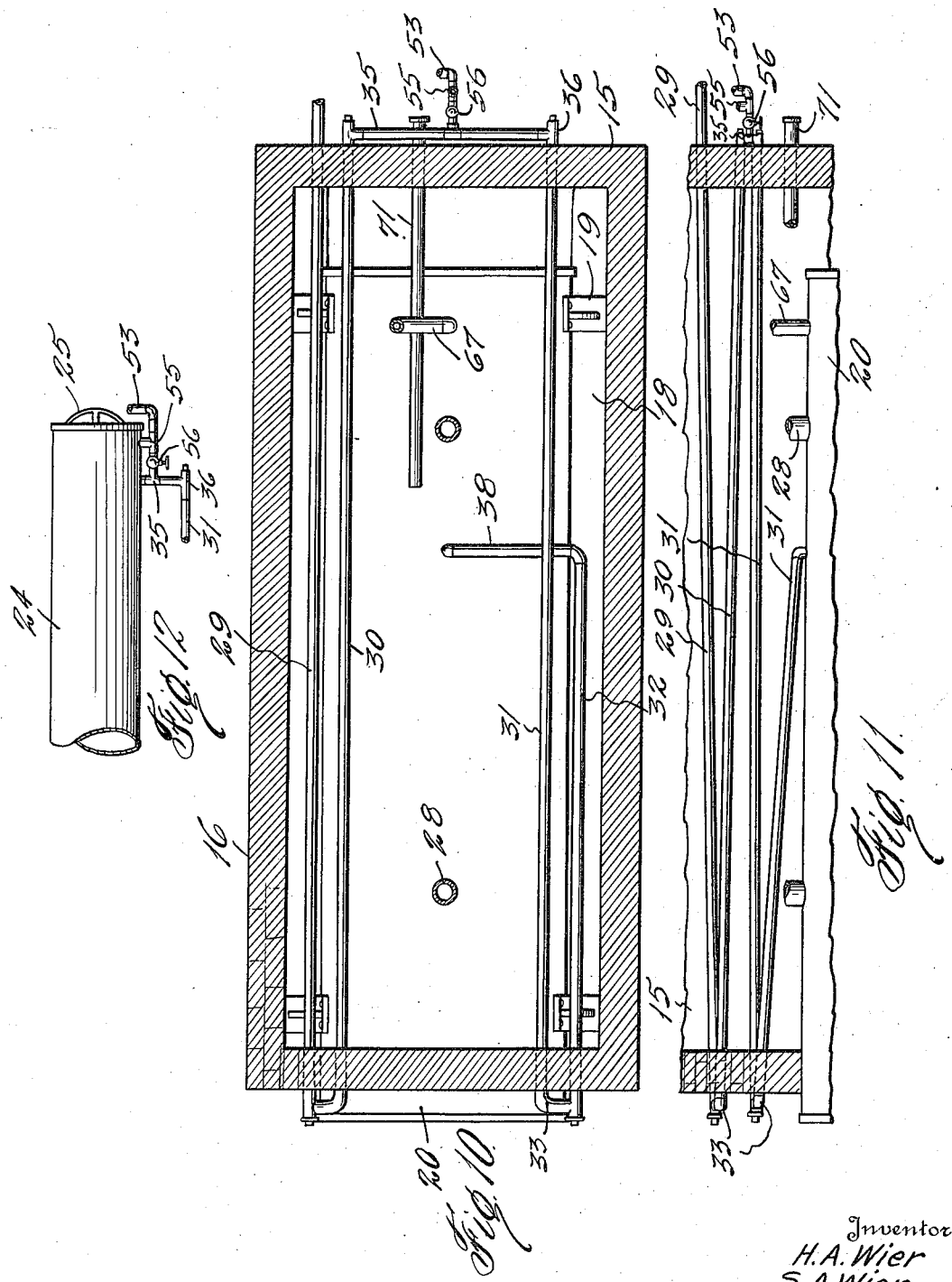

Patented May 8, 1923.

1,454,142

UNITED STATES PATENT OFFICE.

HARRY A. WIER AND STUART A. WIER, OF DALLAS, TEXAS.

MEANS FOR CRACKING HYDROCARBONS.

Application filed April 12, 1920. Serial No. 373,111.

*To all whom it may concern:*

Be it known that we, HARRY A. WIER and STUART A. WIER, citizens of the United States, residing at Dallas, in the county of Dallas and State of Texas, have invented certain new and useful Improvements in Means for Cracking Hydrocarbons, of which the following is a specification.

This invention relates to new and useful improvements in means for cracking hydrocarbons.

The principal features of this invention and the particular advantages accomplished are first, the production of a greater quantity of gasoline, which results, of course, from a more efficient separation and cracking of the hydrocarbons; and second, the quality of the refined products such as gasoline, kerosene, benzine distillates, etc., which is due to a continued and efficient separation of the foreign, heavy and injurious substances from the distillates at the time that the continuous cracking and breaking up of the molecular structures occur. It is obvious that such advantages involved in a process would make for a great saving of time, efficiency, and a more profitable operation.

In carrying out the invention the crude liquid such as crude petroleum is introduced into a main still, having been previously pre-heated and thus having its temperature raised accordingly. This pre-heating is effected by utilizing what would otherwise be waste heat and, therefore, effects a saving in fuel and further materially shortens the time required to heat the crude oil and "take off" a run of the still. The vaporized elements which escape from the main still enter a secondary still which is in close proximity to the main still, thus making for a minimum fuel expenditure. By this arrangement a much more even temperature can be had which tends to prevent agitation and also to break up the hydrocarbon molecules into lighter and more volatile elements, which latter of course are more uniform in composition and of a higher specific gravity.

The vapors arising from the secondary still are passed thru a cooling stage whereby a condensing is effected with the result that the condensate passes back to the secondary still and the gases or vapors pass on to a condensing tower where a further separation is effected. The condensing tower is elevated and connected with the secondary still so that the heavy elements or condensates are trapped in the tower, conveyed to the secondary still and immediately re-run thru the various steps of the process as will be obvious, all without allowing it time to become cool beyond the point of condensation. It is obvious that a higher percentage of recovery will be had by such an operation. It is pointed out that by use of the condensing tower and cooling stage in the manner set forth that the condensates which are returned to the secondary still from the cooling stage are conveyed thru a separate channel from the distillate which is trapped from the tower and returned direct to the secondary still. This removes the possibility of discoloration and produces an extremely high grade gasoline which is much cleaner and more pure than that produced by the ordinary process.

The gases from the tower which are recovered are conveyed to a suitable condenser and finally taken from the apparatus. A feature of importance in connection with this process is, that whereas under ordinary systems of refining there are usually a certain quantity of "wild" or "free" gases that are not condensable in ordinary treatment and which pass entirely thru the main condensers and escape; in our process we employ a baffle plate arrangement in the tower so that the free gases pass upward thru the descending condensates, which latter are of the highest quality, with the result that a large percentage of the free gases are liquefied.

Our process also involves the use of pressure and means for regulating the same because it has been found that a certain amount of pressure on the still is advantageous in carrying out a cracking process. It is pointed out also that our process involves the collection or trapping in the secondary still of certain heavy products and after all the gasoline possible has been recovered an auxiliary heat is applied to the secondary still whereby these collected products are further refined.

Another feature involved in the process is utilized after the more volatile gases, such as those forming gasoline, benzine, kerosene, etc., have been recovered. This feature consists in conveying gases direct from the main still to the condensing coil and its use is restricted, therefore, largely to conducting gases that condense to form solar oil, gas oil, lubricating oil and other heavy or yellow distillates. It may also be used for re-running discolored high grade distillates.

The invention will be more readily understood from a reading of the following specification and by reference to the accompanying drawing in which an apparatus for carrying out the process is illustrated, and wherein:

Fig. 1, is a side elevation of an apparatus constructed for carrying out this process, portions being illustrated in section, Fig. 2 is a transverse vertical sectional view on the line 2—2 of Fig. 1, Fig. 3 is a vertical sectional view of the cooling tower, Fig. 4 is a cross sectional view on the line 4—4 of Fig. 3, Fig. 5 is a sectional detail of one of the pre-heating coil connections, Fig. 6 is a sectional detail of one of the manifold connections.

Fig. 7 is a rear elevation of the upper end of the still housing.

Fig. 8 is an elevation of the front end of the same,

Fig. 9 is a sectional detail of the auxiliary burner,

Fig. 10 is a horizontal cross-sectional view on the line 10—10 of Fig. 2,

Fig. 11 is a side elevation of the pre-heating coil, and

Fig 12 is a detail in elevation of a portion of the secondary still.

In the drawings the numeral 15 designates a still housing which has side walls 16 and a top wall 17. The side walls are shouldered at 18 to receive the brackets 19 of a main still 20 which is cylindrical in form and is disposed longitudinally in the housing. The shoulders 18 contact with the sides of the still so that the products of combustion must pass under the entire length of the still. A burner or a heating element 21 is introduced at the front end of the housing under the main still.

Under the rear end of the main still a bridge wall 22 is disposed and this wall acts as a target for the flame of the burner 21 and also to deflect the products of combustion so as to cause the same to pass upward and impinge the underside of the still. The still 20 terminates short of the rear wall of the housing so that the products of combustion pass upward around the rear end of the still. At the forward end of the housing a stack 23 extends upward from the top wall 17 and from this it will be seen that the products of combustion must again travel the length of the main still in order to escape at the forward end of the housing. There is a space provided between the top of the main still 20 and the top wall 17. A secondary cylindrical still 24 extends longitudinally in the space above the main still and has its ends protruding thru the front and rear walls of the housing. The protruding ends of the secondary still have man holes and covers 25 which may be removed for the purpose of cleaning out said still. The main still has its forward end protruding thru the front wall of the housing and is provided with a man hole and cover 26 whereby it may be cleaned out. A drain pipe 27 leads from the bottom of the main still and is provided with a cut-off valve 27'.

Short flues 28 extend from the top of the main still 20 up into the bottom of the secondary still 24 and terminate a short distance above the bottom of said still 24. These flues are placed a short distance from each end of the main still. As is best shown in Figs. 10 and 11 a crude oil supply pipe 29 passes inward thru the rear wall of the housing and extends the entire length of the latter. The pipe 29 extends thru one side of the housing and a pipe 30 is disposed parallel and adjacent thereto. On the opposite side of the housing pipes 31 and 32 are disposed. These pipes are arranged in the space above the main still 20. All of these pipes extend thru the front wall of the housing and the pipes 29 and 30 are connected with each other as are also the pipes 31 and 32, by means of clean-out connections 33, one of which is shown in detail in Fig. 5. Each connection 33 has a plug 34 which may be removed to give access to the connection which has a general U-shape.

The pipes 30 and 31 extend thru the rear wall of the housing and are connected with a transverse manifold 35 by means of T-couplings 36, one of which is illustrated in section in Fig. 6. Each coupling 36 has a clean-out plug 37. It will be seen that by removing the plugs 34 the pipes 29 and 32 may be cleaned out and also by removing the plugs 37 the pipes 30 and 31 may be cleaned out.

The pipe 32 extends about midway of the housing and is connected to a transverse pipe 38 which is bent downward and passed thru the top of the main still at the central portion thereof. The pipe 38 terminates in close proximity to the bottom of the main still as is shown in Fig. 2. The pipes 29, 30, 31, 32 and 38 form a pre-heating coil. The oil introduced into the housing is thus carried thru the coil before entering the main still 20 and is pre-heated whereby its temperature is raised to a considerable degree. It is pointed out that this pre-heating coil is heated by what would otherwise be waste heat gases. The advantage of thus pre-heating the crude oil is, that it materially shortens the time reuired to "take off" a run of the still. It is obvious that by pre-heating the oil less fuel will be required to raise the temperature of the oil in the main still and by utilizing the waste heat, expense as well as labor is saved.

A dome 39 extends upward from the center of the secondary still 24 thru the top wall 17 of the housing. The dome connects with the center of a tubular cross-head 40 by means of a reduced coupling 40'. Inclined tubes 41 lead upwardly from the cross-head 40 and each tube includes a valve 42 adjacent said cross-head. The tubes are connected at their upper ends to a cross-head 43. The parts 40 to 43 inclusive constitute a radiator or separating member. It is obvious that those vapors which do not condense in the tubes will pass upward, while the condensates will drain back into the cross-head 40 and thru the dome 39 to the secondary still. By means of the valves the flow thru the tubes may be controlled and it is obvious that if one tube is cut off by closing its valve 42 a larger volume of gas or vapor will flow thru the remaining tubes. From this it will be seen that in very cold weather there would probably be an excessive condensation if all of the tubes were used; therefore, by closing some of the tubes the condensing surface would be decreased and proper results had. The valves permit of considerable flexibility and are highly important.

The tubes are relatively small in size in comparison to the cross-head so as to provide a greater radiating surface, and this is done in order that the largest possible condensing surface may be exposed to the rising gases within the tubes, whereby the more volatile, lighter and more finely divided gases may pass on up to the tubes, only after the heavier and less volatile gases of larger molecular structure have been condensed into liquid by contact with the cool walls of the tubes. It will be seen that the hot gases coming in contact quite suddenly with the tubes of the radiator will result in the separation of the hydrocarbons. It will be seen that the heavier products will be carried up into the radiator and drained back and redistilled in the secondary still a number of times whereby the molecular structure will be fully broken up. By this repeated condensing and re-distillation it has been proven that a considerable increase in the percentage of commercial gasoline recovered from the crude oil will be had.

The cross-head 43 connects at one end with a vertical trap cylinder or sleeve 44 which depends from the end of the cross-head and supports above the cross-head an enlarged baffle tower 45. The tower 45 is surrounded by a cooling jacket 46 as is shown in detail in Figs. 3 and 4. A vertical glass gage 47 has its upper and lower ends connected with the upper and lower ends of the jacket. Within the tower 45 downwardly inclined baffle plates 48 are disposed in alternate relation so that products passing thru the tower must pursue a circuitous path as will be obvious. A water circulating pipe 49 passes in proximity to the jacket 46 and has a vertical portion which is connected at different elevations to the jacket by branch pipes 50 each including a cut-off valve 51. A cut-off valve 52 is included in the pipe 49 between the two lowermost branches 50. It will be seen that the elevation of the cooling fluid or water in the jacket may be controlled by closing the valves 51. For instance if the uppermost valve 51 and the valve 52 are closed, the water from the pipe 49 will enter the jacket at the height of the third branch 50 and will flow out thru the lowermost branch 50 which is below the valve 52. By varying the elevation of the cooling liquids in the jacket the degree of temperature within the tower 45 may be controlled and the condensing thus regulated. The gage 47 indicates the level of the liquid within the jacket.

From the bottom of the trap cylinder 44 a drain pipe 53 extends downwardly. This pipe is much smaller in diameter and includes immediately below the cylinder a cut-off valve 54. The cylinder is also provided with a glass gage 44' connected with its upper and lower ends for indicating the height of the fluid or liquid in said cylinder. The pipe 53 leads to the manifold 35 which is connected to the pre-heating coil. As is shown best in Fig. 12 the pipe 53 is connected with the rear end of the secondary still 24 by a T-connection 55. A cut-off valve 56 is included in the pipe 53 between the manifold 35 and the T-connection 55. It will be seen that by closing the valve 56 the liquid conveyed by the pipe 53 will be discharged into the secondary still 24, but by opening said valve 56 the pipe 53 will discharge directly into the manifold 35.

The pipe 49 extends thru and discharges into a cooling tank 57 from the bottom of which a return circulation pipe 58 leads. The tower 45 has a pressure valve 59 on its top and the vapors and gases from the tower pass into the pressure valve. The valve stem is connected with a pressure lever 60 carrying an adjustable weight 61. The gases and vapors must open the valve 59 in order to pass thru the same and thus the pressure below the valve may be regulated by adjusting the weight 61. It has been found advantageous to create a pressure and carry out the distillation operation under a predetermined pressure. A discharge pipe 62 leads from the valve 59 downward to a condensing coil 63 which is submerged within the tank 57. A discharge pipe 64 leads from the coil thru the bottom of the tank to a look-box 65 of the usual construction and from which a discharge pipe 66 extends.

A by-pass pipe 67 leads from the top of the main still 20 up thru the top wall 17 of the housing and includes a cut-off valve 68 above said top wall. The pipe 67 connects with the pipe 62 just above the tank 57. A cut-off valve 68' is in the pipe 62 just above its connection with the pipe 67. At its forward end the secondary still 24 has connections with a glass gage 69 as is best shown in Fig. 8. Under the secondary still 24 an auxiliary burner 70 is disposed within a draft tube 71 which has its entrance outside of the housing. In order to support combustion in the space between the main and secondary stills in which space the burner is located, it is necessary to introduce oxygen as will be readily understood.

In carrying out the process crude liquids as for instance crude petroleum is introduced thru the pipe 29 and supplied to the pre-heating coil which is composed of the pipes 30, 31, 32 and 33 in addition to the pipe 29. The cold fluid is thus heated and the temperature raised so that it enters the main still 20 in a warm state and not only makes for economy in the consumption of fuel and labor, but prevents violent agitation which frequently occurs where a cold fluid is introduced into a hot still, with the result that the whole apparatus overflows and the entire product is discolored and must be rerun as is well known. With the valve 68 closed and the valve 68' opened the hot gases or vapors from the main still 20 will pass up thru the flues 28 and discharge into the secondary still 24. The secondary still is kept at a much more uniform temperature than the main still and this is effected partially by making the secondary still considerably smaller in diameter. This prevents agitation in the liquid to a large extent and tends to break up into lighter and more volatile elements the hydrocarbon molecules throughout the liquid, which it will be noticed is of a much higher Baumé gravity and more uniform in composition than the crude petroleum in the main still, because the secondary still contains largely condensates which have once passed thru the secondary still and the condensing and cracking elements above.

The flues 28 extending above the bottom of the secondary still will trap a certain percentage of liquids and will prevent the same from running back into the main still. It is pointed out that any overflow from the secondary still to the main still is of a high temperature and will not cause severe agitation. The gases passing from the main still into the secondary still are heated whereby their temperature is raised and they are thus collected in the dome 39 from which the lightest gases pass upward to the cross-head 40 and into the pipes or tubes 41. As before explained the tubes form part of a radiator and being at a much lower temperature it is obvious that the hot gases upon entering these cool tubes will be subjected to a much lower temperature whereby the hydrocarbons will be separated and the less volatile gases will be immediately condensed. The condensates will drain back owing to the inclination of the radiator thru the cross-head 40, dome 39 and into the secondary still 24. By adjusting the valves 42 the number of tubes 41 employed may be varied and thus the condensing action may be controlled according to the temperature. One of the important results of this construction is that the condensate or heavy material which drains back from the radiator is immediately rerun and recracked without allowing it time to become cool beyond the point of condensation. This means that whereas a considerable separation has been effected, leaving in the main still the tar, sulphur, asphaltum and heavy greases, a still further separation or cracking is immediately brought about which drives off from the secondary still a larger percentage of the pure and most volatile gases. These gases which are driven off from the secondary still make gasoline when condensed. The heavier distillates, though relatively clean, are left in the secondary still and these will be referred to later.

Those gases which succeed in passing thru the radiator travel from the cross-head 43 into the trap cylinder 44. The gases rise into the condensing tower 45. It has been found that such gases as do not condense to liquids when subjected to a lowering of temperature, will often condense when subjected to dripping or spraying liquid of their own or like condensates. This is brought about by having the cooling jacket 46 condense a certain amount of the gases and these fall as liquid upon the baffle plates 48 and the more volatile gases must ascend thru this drip or spray. The entire condensate resulting in this tower is precipitated and caught in the trap cylinder 44 from which it gravitates thru the pipe 53 down to the secondary still 24 thru the connection 55, provided the valve 56 is closed. It is from the condensing tower that a large proportion of the condensate is returned to the secondary still for redistillation and it is pointed out that this condensate returns to the secondary still thru a separate channel from that which flows back from the radiator, therefore, all possibility of discoloration of ascending vapors by contact with the descending and lower grade liquids is obviated. By subjecting the ascending gases to the dripping liquids from the baffle plates a large percentage of the so called "free" gases is recovered. It will be seen that the gases may be condensed and the condensates passed back to the secondary still several times before all of the lighter and more volatile elements are recovered.

By provision of the valve 59 a pressure may be created on all gases below said valve and it has been proven that a certain amount of pressure on a still will assist in breaking up or cracking the hydrocarbons and thus increase the percentage of recovery of the lighter and more volatile elements. One of the reasons is that the pressure created will hold the gases in the stills during a longer period, whereby they are cracked to a greater extent by being exposed to the heat for a longer period of time.

Those gases which are most volatile will pass the valve 59 and escape into the discharge pipe 62 from which they will pass down into the coil 63 where the final condensation is had. The condensed liquids pass out thru the pipe 64 thru the look box 65 and finally thru the pipe 66. The quality and condition of the condensed liquid may be observed at the box 65.

After all of the gasoline which is possible to recover has been obtained from the crude oil, the auxiliary burner 70 under the secondary still is put into operation. Up to this point in the process a uniform heat at the secondary still has been necessary, but this is not essential for the recovery of kerosene and the lower distillates. It will be seen that heavy elements and condensates are passed back to the secondary still and trapped therein by the flues 28. By applying heat directly to the secondary still these deposits are heated to a much higher degree and the more volatile elements are vaporized and passed thru the system as had been done with the other elements.

When all the kerosene possible has been extracted and the distillates remaining in the trap cylinder 33 have become of such low gravity as to render further distillation of little value, which condition may be ascertained by making a suitable test, the auxiliary burner is extinguished. The valve 56 as best shown in Fig. 12, is opened whereby the contents of the secondary still may pass down into the manifold 35 and thru the pre-heating coil to the main still. When this is done the valves 42 and 68' are closed and the valve 68 is open. This causes vapors arising from the main still to then pass out thru the by-pass pipe 67 direct to the coil 63. The gases which are thus driven off are too heavy to pass up into the secondary still and the condensing portion of the apparatus, but they will readily pass out under high heat directly thru the single large pipe 67 to the condensing coil 63. These gases when condensed make solar oil, gas oil and heavy distillates. These heavy distillates make lubricating oil as well as greases. This by-pass pipe has further use in that by such distillates as gasoline, benzine and kerosene, etc., which have become discolored by being run into dirty tanks or thru dirty pipes, or in cleaning condensing coils, may be quickly re-cleaned, when the discoloration is not very great, by being vaporized in the main still and run off directly thru the pipe 67. It will be seen that the apparatus has many possibilities and the process permits of the complete refining of crude oil.

What we claim, is:

1. In an apparatus for cracking hydrocarbons, a still housing having a combustion chamber in its bottom, an approximately horizontal main still disposed within the still housing above the combustion chamber with its sides disposed adjacent the side walls of the still housing, said main still terminating at a point spaced forwardly from the rear end wall of the still housing, providing an upstanding gas passage, an approximately horizontal secondary still arranged in the still housing above and spaced from the main still with its ends projecting through the end walls of the still housing, upstanding pipes connected with the top of the main still and extending through the bottom of the secondary still into the same and terminating above the bottom of the secondary still, and a condenser connected with the upper secondary still.

2. In an apparatus for cracking hydrocarbons, a still housing having a combustion chamber in its bottom and a bridge wall at the rear of the combustion chamber, a stack connected with the forward end of the still housing, a substantially horizontal main still disposed within the still housing above the combustion chamber and extending longitudinally thereof, said still having its rear end spaced from the rear end wall of the still housing to form a vertical gas passage, the rear portion of the still being also vertically spaced from the bridge wall, said main still serving to divide the still housing into upper and lower chambers having communication at their rear ends by said vertical gas passage, a substantially horizontal secondary still extending longitudinally within the still housing above and spaced from the main still with its ends extending through the end walls of the still housing, said secondary still having a smaller cross sectional area than the main still, upstanding pipes connected with the main still and projecting through the bottom of the secondary still with their upper ends arranged above said bottom, a gas outlet conduit leading through the top of the still housing and connected with the secondary still between its ends, and a condenser connected with the gas outlet conduit.

3. In an apparatus for cracking hydrocarbons, a still housing having a combustion chamber in its bottom, a main still extending longitudinally within the housing and spaced from the rear end wall thereof to constitute a vertical gas passage, said main still serving to divide the still housing into upper and lower chambers connected by said gas passage, a secondary still extending longitudinally within the upper chamber of the still housing and having its rear end passing through the rear end wall of the still housing and projecting exteriorly beyond said rear end wall, conduits connecting the upper portion of the main still with the lower portion of the secondary still, a condenser having connection with the secondary still at a point within the still housing, and a return conduit connected with the condenser and connected with the rear end of the secondary still at a point exteriorly of the still housing.

4. In an apparatus for cracking hydrocarbons, a still housing having a combustion chamber in its bottom, a main still extending longitudinally within the housing and spaced from the rear end wall thereof to constitute a vertical gas passage, said main still serving to divide the still housing into upper and lower chambers connected by said gas passage, a secondary still extending longitudinally within the upper portion of the still housing and having its rear end passing through the rear end wall of the still housing and projecting exteriorly beyond such rear end wall, conduits connecting the upper portion of the main still with the lower portion of the secondary still, a condenser having connection with the secondary still at a point within the still housing, a return conduit connected with the condenser and connected with the rear end of the secondary still at a point exteriorly of the still housing, and a burner arranged between the main still and secondary still.

5. In an apparatus for cracking hydrocarbons, a still housing, a substantially horizontal main still arranged therein, a substantially horizontal secondary still arranged within the housing above the main still, upstanding conduit means connecting the main still and secondary still within the still housing, a dome extending through the top of the still housing and leading into the secondary still, a cross head arranged exteriorly of the top of the still housing and connected with the dome, inclined pipes connected with the cross head, an upper cross head connected with the upper ends of the inclined pipes, a condenser connected with the upper cross head, and a conduit connecting the upper cross head with one end of the secondary still.

6. In an apparatus for cracking hydrocarbons, a still housing, a substantially horizontal main still arranged therein, a substantially horizontal secondary still arranged within the housing above the main still, upstanding conduit means connecting the main still and secondary still within the still housing, a dome extending through the top of the still housing and leading into the secondary still, a cross head arranged exteriorly of the top of the still housing and connected with the dome, inclined pipes connected with the cross head, a vertical trap cylinder, and upper cross head connected with the trap cylinder and with the upper ends of the inclined pipes, a conduit connecting the trap cylinder with one end of the upper secondary still, a vertical tower connected with the upper end of the trap cylinder and having staggered baffles, and a condenser connected with the upper portion of the tower.

7. In an apparatus for cracking hydrocarbons, a still, a dome connected with the upper portion of the still, a substantially horizontal cross head connected with the dome, inclined pipes connected with the substantially horizontal cross head at their lower end, and upper substantially horizontal cross head connected with the upper ends of the inclined pipes, a vertical trap cylinder connected with one end of the upper cross head, a conduit connecting the lower end of the trap cylinder with the still, a tower having a water jacket, said tower being connected with the upper end of the trap cylinder, and staggered inclined baffles arranged within the tower directly above the trap cylinder, and a condenser connected with the top of the tower.

In testimony whereof we affix our signatures.

HARRY A. WIER.
STUART A. WIER.